(12) United States Patent
Maula et al.

(10) Patent No.: US 7,021,330 B2
(45) Date of Patent: Apr. 4, 2006

(54) DIAPHRAGM VALVE WITH RELIABILITY ENHANCEMENTS FOR ATOMIC LAYER DEPOSITION

(75) Inventors: Jarmo Ilmari Maula, Espoo (FI); Hannu Leskinen, Espoo (FI); Teemu Lang, Helsinki (FI); Pekka Kuosmanen, Espoo (FI); Kari Härkönen, Kauniainen (FI); Bradley J. Aitchison, Eugene, OR (US)

(73) Assignee: Planar Systems, Inc., Beaverton, OR (US)

( * ) Notice: Subject to any disclaimer, the term of this patent is extended or adjusted under 35 U.S.C. 154(b) by 132 days.

(21) Appl. No.: 10/609,339

(22) Filed: Jun. 26, 2003

(65) Prior Publication Data

US 2004/0262562 A1    Dec. 30, 2004

(51) Int. Cl.
*F16K 49/00*    (2006.01)
*F16K 31/126*    (2006.01)

(52) U.S. Cl. ..................... 137/341; 251/331
(58) Field of Classification Search ............. 251/331, 251/129.15, 129.18; 137/334, 341
See application file for complete search history.

(56) References Cited

U.S. PATENT DOCUMENTS

| | | | |
|---|---|---|---|
| 3,606,241 A | | 9/1971 | Bornholdt |
| 4,273,028 A | * | 6/1981 | Turnwald et al. .............. 91/275 |
| 4,437,488 A | | 3/1984 | Taggart et al. |
| 4,513,945 A | * | 4/1985 | Otsuki et al. .......... 251/129.15 |
| 4,582,294 A | | 4/1986 | Fargo |
| 4,826,132 A | * | 5/1989 | Moldenhauer ......... 251/129.17 |
| 4,903,938 A | | 2/1990 | Nishizawa et al. |
| 4,944,487 A | | 7/1990 | Holtermann |
| 5,112,027 A | * | 5/1992 | Hanyu et al. ............... 251/331 |
| 5,188,337 A | | 2/1993 | Mertens et al. |
| 5,282,604 A | | 2/1994 | Wade |
| 5,326,078 A | | 7/1994 | Kimura |
| 5,375,738 A | | 12/1994 | Walsh et al. |
| 5,383,646 A | * | 1/1995 | Weingarten ................. 251/331 |
| 5,386,849 A | * | 2/1995 | Gilchrist et al. ............ 251/331 |
| 5,413,311 A | | 5/1995 | Arstein et al. |
| 5,520,001 A | * | 5/1996 | Miyamoto et al. ........... 62/50.2 |
| 5,624,102 A | | 4/1997 | Nishimura et al. |
| 5,669,596 A | | 9/1997 | Yoshikawa et al. |
| 5,743,513 A | | 4/1998 | Yoshikawa et al. |

(Continued)

OTHER PUBLICATIONS

Detroit Coil Co., "What is a Solenoid?", http://www.detroit-coil.com/whatis.htm, visited May 19, 2003, 10 pages.

(Continued)

*Primary Examiner*—Kevin Lee
(74) *Attorney, Agent, or Firm*—Stoel Rives LLP

(57) ABSTRACT

A shut-off type diaphragm valve adapted for use in an atomic layer deposition system includes a valve seat having an annular seating surface that surrounds an inlet of the valve and extends radially therefrom. The seating surface contacts a substantial portion of the first side of a flexible diaphragm when the diaphragm is closed, to facilitate heat transfer and counteract dissipative cooling of the diaphragm, thereby inhibiting condensation of a medium flowing through the valve passage. The seating surface is preferably flat and smooth, to prevent shearing of an elastomeric diaphragm. For a plastic diaphragm, a ring-shaped seating ridge may extend from the seating surface to cause localized permanent deformation of the diaphragm and enhanced sealing, while still allowing a substantial portion of the diaphragm to contact the seating surface for enhanced heat transfer. Valve speed enhancements and other reliability enhancing features are also described.

66 Claims, 5 Drawing Sheets

U.S. PATENT DOCUMENTS

| | | | |
|---|---|---|---|
| 5,755,428 A | 5/1998 | Ollivier | |
| 5,820,105 A | 10/1998 | Yamaji et al. | |
| 5,865,421 A | 2/1999 | Ono | |
| 5,881,997 A | 3/1999 | Ogawa et al. | |
| 6,007,046 A | 12/1999 | Rothermel | |
| 6,073,648 A * | 6/2000 | Watson et al. | 137/375 |
| 6,092,550 A | 7/2000 | Gotch et al. | |
| 6,116,267 A | 9/2000 | Suzuki et al. | |
| 6,179,925 B1 * | 1/2001 | Schmitt et al. | 118/726 |
| 6,202,672 B1 | 3/2001 | Ellis et al. | |
| 6,241,213 B1 * | 6/2001 | Butler | 251/331 |
| 6,394,415 B1 | 5/2002 | Ohmi et al. | |
| 6,508,453 B1 | 1/2003 | Mamyo | |
| 6,585,823 B1 * | 7/2003 | Van Wijck | 117/89 |
| 6,659,421 B1 * | 12/2003 | Goossens | 251/129.02 |
| 6,752,387 B1 | 6/2004 | Nishizato et al. | 261/62 |
| 2003/0121608 A1 | 7/2003 | Chen et al. | 156/345.33 |

OTHER PUBLICATIONS

Fujikin, Inc., Straight Diaphragm Valves specification sheet, http://www.fujikin.com.jp/topics/topics2_e.htm, visited May 20, 2003, 3 pages.

Fujikin, Inc., Mega-One LA Direct Diaphragm Valve with Pneumatic Cylinder, http://www.fujikin.co.jp/prodinf/en/pure/mega/la.html, visited May 20, 2003, 5 pages.

* cited by examiner

DIAPHRAGM VALVE WITH RELIABILITY ENHANCEMENTS FOR ATOMIC LAYER DEPOSITION

TECHNICAL FIELD

The present invention relates to a diaphragm valve that is particularly useful in high-temperature thin film deposition systems and equipment.

BACKGROUND OF THE INVENTION

Atomic Layer Deposition ("ALD"), also known as Atomic Layer Epitaxy ("ALE"), is a method of depositing thin films onto a substrate that involves sequential and alternating self-saturating surface reactions. The ALD process is described in U.S. Pat. No. 4,058,430 of Suntola et al., which is incorporated herein by reference. ALD offers several benefits over other thin film deposition methods, such as Physical Vapor Deposition ("PVD") (e.g., evaporation or sputtering) and Chemical Vapor Deposition ("CVD"), which are well known to those skilled in the art, as described in *Atomic Layer Epitaxy* (T. Suntola and M. Simpson, eds., Blackie and Son Ltd., Glasgow, 1990). ALD methods have been proposed for use in depositing thin films on semiconductor wafer substrates, to achieve desired step coverage and physical properties needed for next-generation integrated circuits.

Successful ALD growth requires the sequential introduction of two or more precursor vapors into a reaction space around the substrate surface. Typically, ALD is performed at elevated temperatures and reduced pressures. For example, the reaction space may be heated to between 150° C. and 600° C., and operated at a pressure of between 0.1 mbar and 50 mbar. Even at such high temperatures and low operating pressures, pulses of precursor vapors are not delta functions, meaning they have a substantial rise and decay time. Sequential pulses of precursor vapors will overlap if the second pulse is started before the first pulse is completely decayed, i.e., before excess first precursor vapor is substantially eliminated from the reaction space. If substantial amounts of the different precursor vapors are present in the reaction space at the same time, then non-ALD growth can occur, which can generate particles or non-uniform film thickness. To prevent this problem, the pulses of precursor vapor are separated by a purge interval during which the reaction space is purged of excess amounts of the first precursor vapor. During the purge interval, the reaction chamber is purged by flushing the reaction chamber with an inert gas, application of a vacuum, pumping, suction, or some combination thereof.

The ALD reaction space is typically bounded by a reaction chamber, which is fed by one or more precursor material delivery systems (also called "precursor sources"). The size of the reaction space is affected by the dimensions of the reaction chamber needed to accommodate the substrate. Some reaction chambers are large enough to fit multiple substrates for batch processing. However, the increased volume of the reaction space in a batch processing system may require increased precursor pulse durations and purge intervals.

To prevent overlap of the precursor pulses and to form thin films of relatively uniform thickness, an ALD process may require purge intervals that are ten times longer than the duration of precursor vapor pulses. For example, a thin film deposition process may include thousands of precursor vapor pulses of 50 ms duration alternating with purge intervals of 500 ms duration. Long purge intervals increase processing time, which can substantially reduce the overall efficiency of an ALD reactor. The present inventors have recognized that reducing the rise and decay times also reduces the overall time required for precursor pulse and purge without causing non-ALD growth, thereby improving the throughput of the ALD reactor.

A precursor material delivery system may typically include one or more diaphragm valves positioned in a flow path of the system, for preparing and dispensing one or more precursor vapors. The precursor vapors are pulsed into the reaction chamber by opening and closing the appropriate diaphragm valves in the precursor delivery system. Diaphragm valves can also be used for controlling the flow of inert gases and other materials into and out of the ALD reactor. Known diaphragm valves commonly have an actuator for opening and closing a flexible diaphragm against a valve seat. When the diaphragm is in the open position, the precursor vapor is allowed to pass through a valve passage and enter the reaction chamber. When closed, the diaphragm blocks the valve passage and prevents the precursor vapor from entering the reaction chamber. Because ALD processing can require many thousands of cycles of precursor pulse and purge for forming a film on a single workpiece, valves used in an ALD system should have very high durability and be able to perform millions of cycles without failure.

Hydraulic and pneumatic actuators typically include dynamic seals that can fail under the high temperatures and large number of cycles required for delivery of precursor gases and purge gases in an ALD system.

Solenoid type actuators are desirable because they typically have a faster response time than pneumatic and hydraulic actuators, and are capable of a large number of open-close cycles. However, solenoid actuators generate heat when electric current is applied and, like hydraulic and pneumatic valves, solenoid actuated valves can fail when exposed to the high temperatures required for maintaining some precursor materials in vapor form. Heat can degrade the insulation around the solenoid windings, resulting in electrical shorting between windings and failure of the solenoid coil. It can also melt a plastic bobbin around which the solenoid coil is wound. The present inventors have recognized that active cooling of the actuator to avoid heat-related failure tends to also draw heat from the diaphragm, valve seat, and walls of the valve passage, which can cause the precursor material to condense or solidify in the valve passage. Condensation and buildup of precursor material on the diaphragm and valve seat can cause the valve to leak or clog, leading to undesirable non-ALD growth and particles in the reaction chamber.

For successful ALD processing, precursor gases are typically delivered to the reaction chamber at temperatures in excess of 100° C. and often between 200° C. and 300° C. particularly the varieties of precursor materials used for forming thin films on semiconductor substrates. With a conventional diaphragm valve, a significant amount of heat is conducted from the flow pat through the Valve, where it dissipates to the surrounding environment. Heat dissipation through the valve can result in cooling of the flow path and the associated condensation problems discussed above. To avoid condensation, the flow path may be heated, as described for instance, in U.S. Provisional Patent Application No. 60/410,067 filed Sep. 11, 2002, titled "Precursor Material Delivery System for Atomic Layer Deposition," which is owned by the assignee of the present invention and incorporated herein by reference. However, heating the flow path may tend to contribute to overheating of the actuators in conventional diaphragm valves. The present inventors have recognized a need for an improved diaphragm valve in which the valve passage, diaphragm, and valve seat can be kept hot enough to prevent the precursor vapor from condensing (typically in the range of 130° C. to 260° C. or hotter), without overheating the valve actuator.

U.S. Pat. No. 5,326,078 of Kimura, U.S. Pat. No. 6,116,267 of Suzuki et al., and U.S. Pat. No. 6,508,453 of Mamyo describe known diaphragm valves for controlling the flow of high temperature gases for semiconductor manufacturing.

The present inventors have recognized that a need remains for a valve in which the diaphragm is kept at a temperature sufficient to prevent condensation of ALD precursor materials while not exceeding the temperature limits of the actuator. The inventors have also recognized a need for a durable valve that transitions from an open position to a closed position more quickly than prior art valves.

SUMMARY OF THE INVENTION

In accordance with the invention, a shut-off type diaphragm valve includes a rigid valve seat surrounding an inlet or an outlet of the valve passage. A flexible diaphragm is positioned adjacent the valve passage opposite the valve seat and is operable in response to an actuation force to flex between an open position, wherein a medium can flow through the valve passage, and a closed position in which a first side of the diaphragm is pressed against the valve seat to prevent the flow of medium through the valve passage. The actuation force may be applied by a solenoid or hydraulic actuator, for example. The valve seat includes an annular seating surface that extends radially from the inlet and is sized and shaped to contact a substantial portion of the first side of the diaphragm when the diaphragm is flexed to the closed position, thereby facilitating heat transfer between the valve seat and the diaphragm. Improved heat transfer between the valve seat and the diaphragm can counteract dissipative cooling of the diaphragm (to the environment), thereby inhibiting the medium from condensing or freezing in the valve passage.

When an elastomeric diaphragm is used the annular seating surface is preferably devoid of sharp features, to prevent shearing of the diaphragm when pressed against the valve seat. The annular seating surface may also be made sufficiently large so that the diaphragm, when closed, will not contact an outer peripheral edge of the seating surface. When a plastic diaphragm is used, the valve seat may include a ring-shaped seating ridge that extends from the seating surface high enough to cause localized permanent deformation of the first side of the diaphragm when closed, while being short enough to allow a substantial portion of the diaphragm to contact the annular seating surface. In some embodiments, the seating surface is polished to improve heat transfer from the valve seat to the diaphragm, when closed. A spacer ring may also be interposed between the valve seat and the valve body to establish an axial position of the seating surface relative to the valve body, for more accurate control of valve seating force.

Additional aspects and advantages of the invention will be apparent from the following detailed description of preferred embodiments, which proceeds with reference to the accompanying drawings.

DETAILED DESCRIPTION OF PREFERRED EMBODIMENTS

Figure 1:
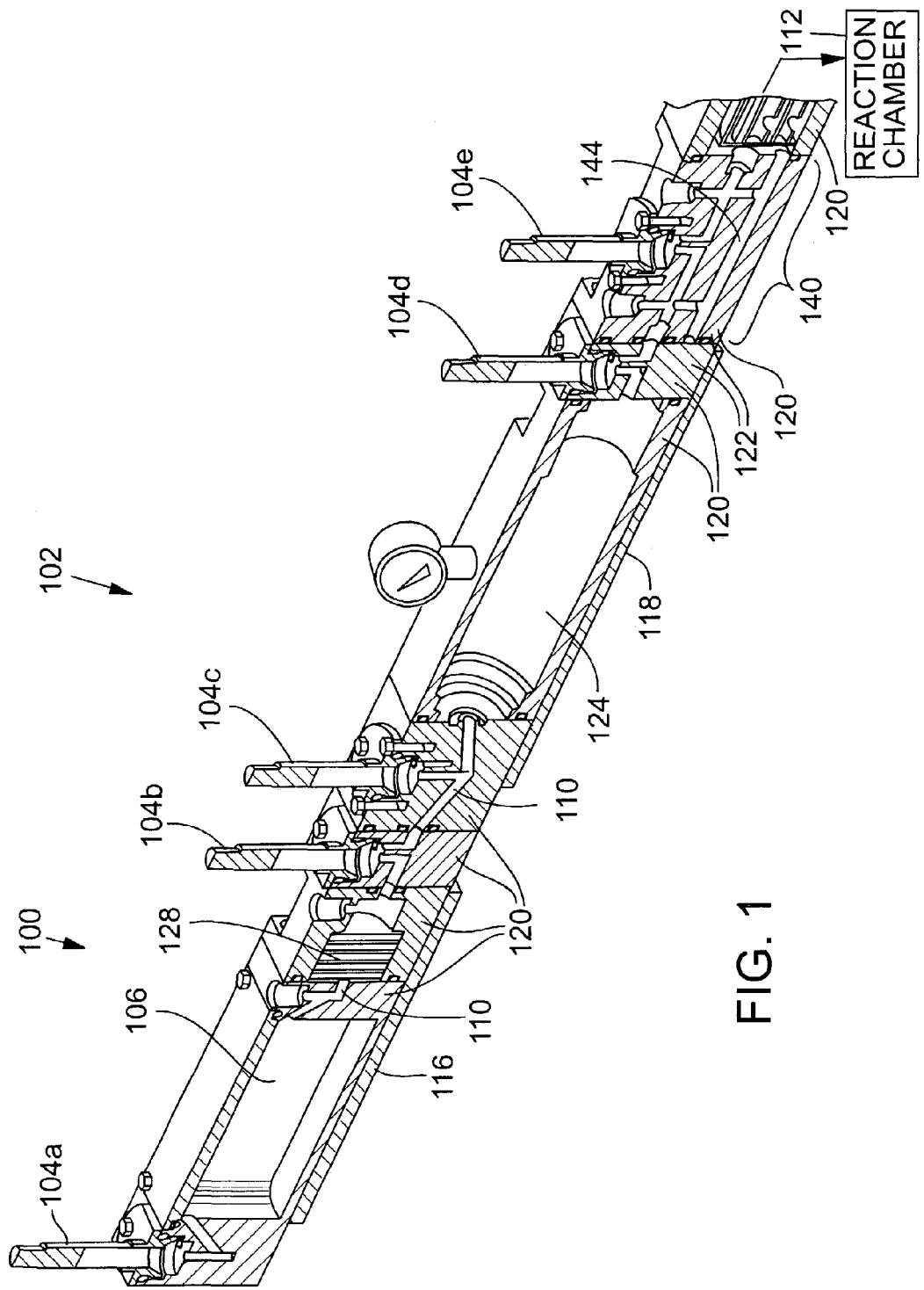
FIG. 1 is an isometric section view of a precursor delivery system including several diaphragm valves.

FIG. 1 is an isometric section view of a precursor material delivery system 100 of an ALD reactor 102, which comprises an exemplary environment of use for valves 104a–104e, in accordance with a first preferred embodiment. With reference to FIG. 1, a supply of precursor material is stored in a precursor container 106, where it is heated and vaporized before flowing through a flow path 110 of the precursor material delivery system 100 (generally from left to right in FIG. 1) and into a reaction chamber 112. ALD reactor 102 will typically have two or more precursor material delivery systems 100 connected to reaction chamber 112. Precursor material delivery system 100 includes electric heaters 116 and 118 for heating precursor materials in the flow path 110. Valves 104a–104e are used to control the flow of precursor material and regulate pressure of the precursor vapor at different stages in precursor material delivery system 100.

Precursor material delivery system 100 preferably includes removable modules 120 having bodies 122 machined from solid blocks of thermally conductive material, such as aluminum, titanium, or stainless steel. Modules 120 have various different functions, such as storage, vaporization, valving, filtering, and pulsing of precursor materials, and purging with inert gases. Modules 120 preferably all have a heavy construction that promotes diffusive conduction of heat from heaters 116 and 118 to promote a smooth temperature gradient along the length of precursor material delivery system 100, increasing in temperature toward reaction chamber 112. The downstream heater 118 may operate at a temperature slightly higher than the upstream heater 116 to facilitate the temperature gradient. In an alternative embodiment (not shown), a greater number of heating zones may be employed. A positive temperature gradient is important for preventing undesirable condensation or freezing of precursor gases in flow path 110 at any point downstream from precursor container 106. The magnitude of the temperature gradient is not typically important, so long as the temperature and pressure conditions within flow path 110 are sufficient to prevent condensation or freezing of precursor vapors. To maintain vaporization, heaters 116 and 118 may typically be operated at temperatures in the range of approximately 50° C. and 300° C.

A volume module 124 is provided downstream from the precursor container 106 for preparing a dose of gas-phase precursor material. A particle filter module 128 prevents particles from being transported from precursor container 106 into volume module 124. Valve 104d is a diaphragm valve used to control the timing and duration of pulses of precursor vapor introduced into the reaction chamber 112 by precursor material delivery system 100. A diffusion barrier module 140 includes valve 104e for controlling the direction of an inert gas flow in a barrier section 144 of flow path 110 located between diaphragm valve 104d and reaction chamber 112.

Figure 2:
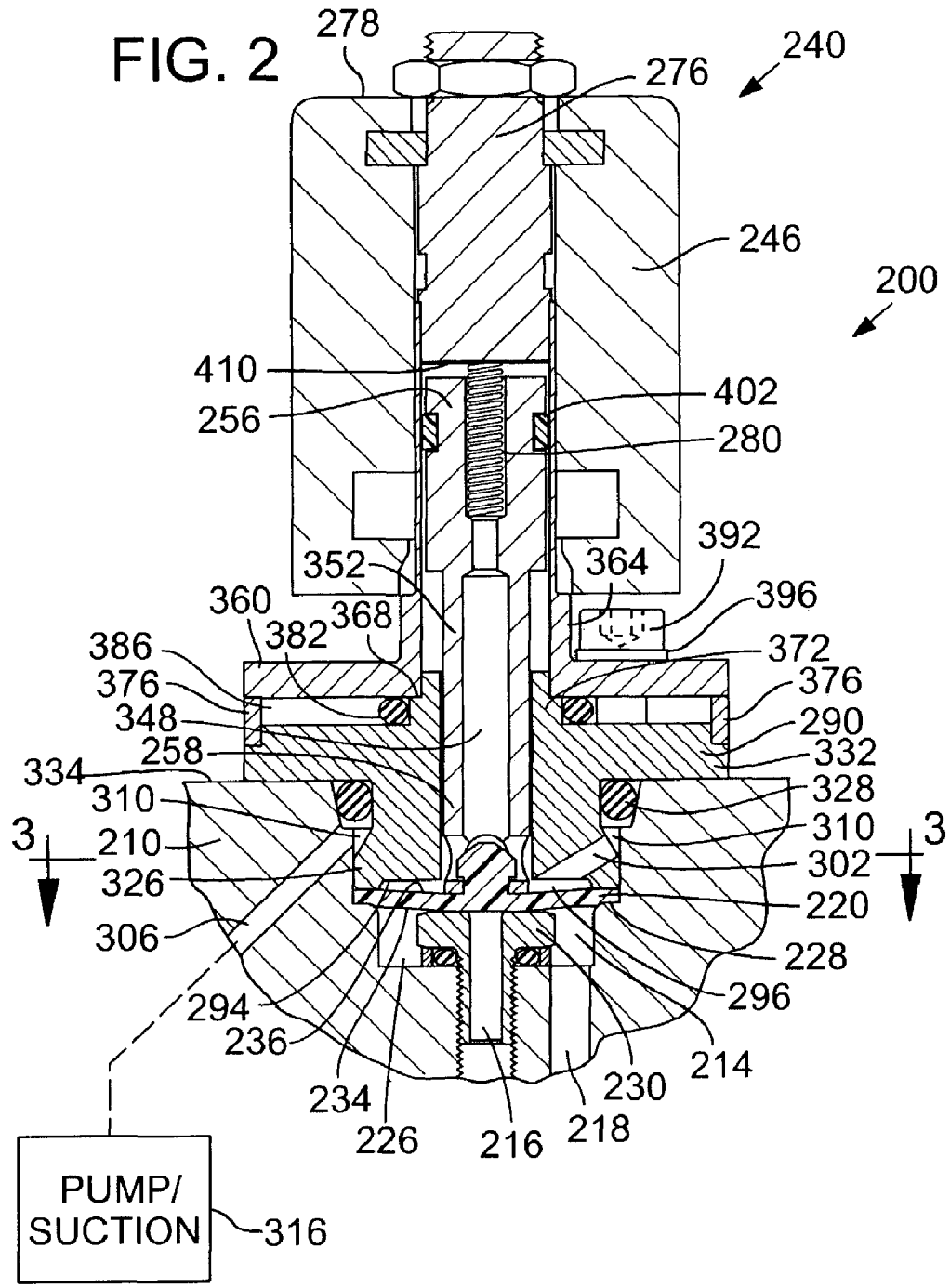
FIG. 2 is a cross section elevation view of one of the diaphragm valves of FIG. 1, with a diaphragm of the diaphragm valve shown in a closed position.

FIG. 2 is a cross-section elevation view of a diaphragm valve 200 in accordance with a preferred embodiment, which is exemplary of valves 104a–104e (FIG. 1). With reference to FIG. 2, diaphragm valve 200 includes a valve body 210 that defines a valve passage 214 through which a medium can flow when diaphragm valve 200 is open. Valve passage 214 includes an inlet 216 and an outlet 218, which are selectively interruptible by a flexible diaphragm 220, which blocks valve passage 214 when flexed to a closed position, as shown in FIG. 2. Valve body 210 is preferably integrally formed with the body 122 of one of the modules 120 of precursor material delivery system 100 (FIG. 1). Forming valve passage 214 in module body 122 facilitates connection of inlet 216 and outlet 218 to adjoining portions of flow path 110 in adjoining modules 120 of precursor material delivery system 100. Alternatively, valve body 210 may comprise a separate structure, which, when used in an ALD precursor material delivery system 100, may be coupled to the module body 122. Valve body 210 is preferably formed from a solid billet of material having good thermal conductivity. However, valve body 210 may, alternatively, be formed of multiple parts or by means other than machining from a solid billet, such as by molding or casting, for example. Suitable valve body materials for use in ALD system 102 include aluminum, titanium, and stainless steel. Other materials such as copper, brass, other metals, and molded materials such as high temperature plastics and molded metals may also be suitable for use in valve body 210 depending on the environment in which diaphragm valve 200 is to be used.

In the preferred embodiment, inlet 216 and outlet 218 extend in a generally axial direction relative to diaphragm valve 200. However, in alternative embodiments (not shown), valve passage 214 may include a straight-through passage extending transversely to diaphragm valve 200. Still further alternatives may include a weir formed in the valve body between the inlet and outlet. Many other means and structures may be used for defining valve passage 214 to handle the flow of a medium such as a fluid (liquid and/or gas) or slurry.

Figure 4:
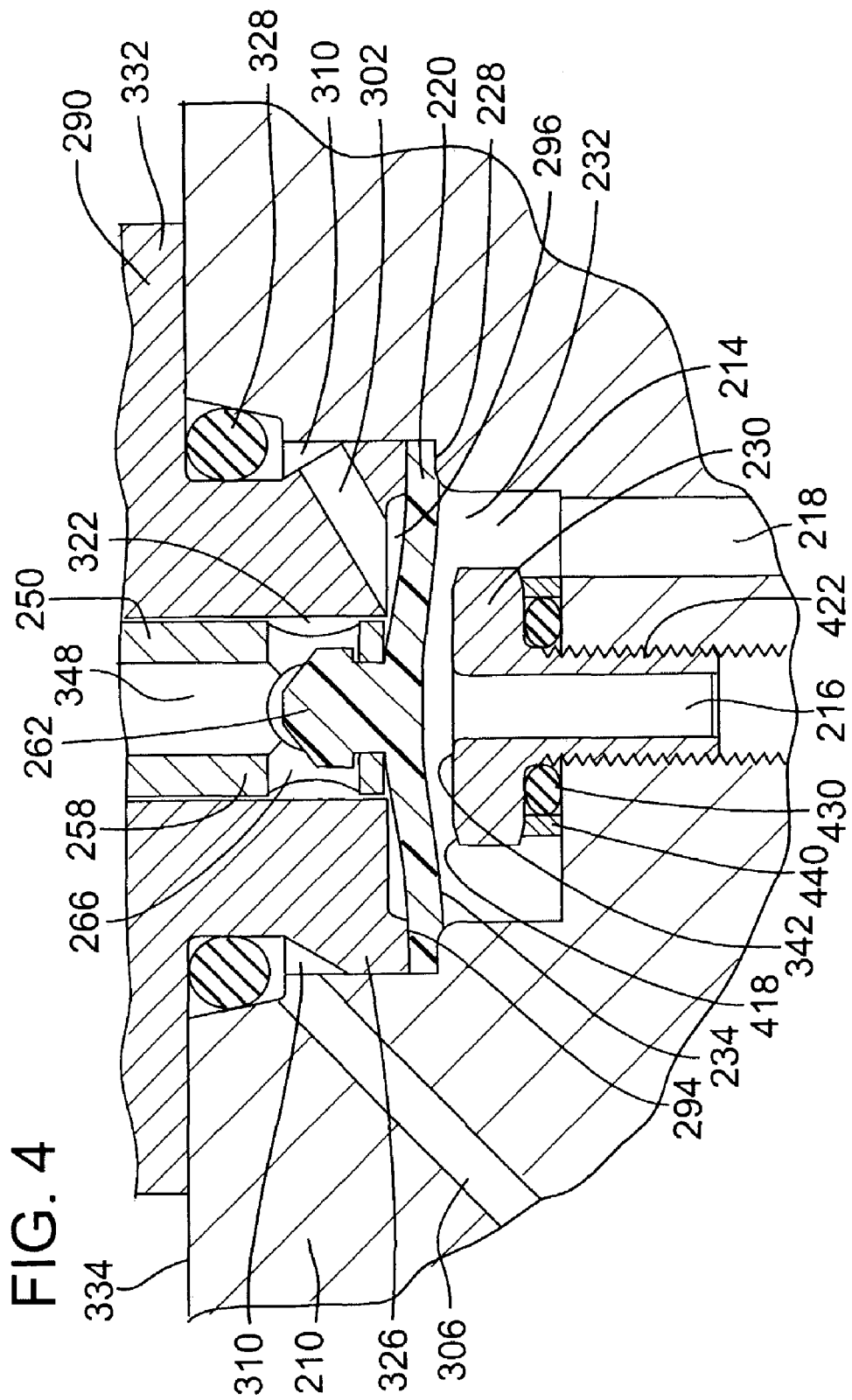
FIG. 4 is an enlarged cross section view detailing the region of a valve passage, valve seat, and diaphragm of the diaphragm valve of FIG. 2, with the diaphragm shown transitioned to an open position.

Inlet 216 and outlet 218 extend into a cylindrical blind bore 226 bordered by a rim 228 against which diaphragm 220 is secured. Bore 226 is deep enough to accommodate a valve seat 230 against which diaphragm 220 is pressed when transitioned to the closed position. Bore 226 is also sized to allow the medium to flow through valve passage 214 between inlet 216 and outlet 218 when diaphragm 220 is transitioned to the open position (FIG. 4). Thus, bore 226 forms side and bottom boundaries of a central chamber 232 (FIG. 4) of valve passage 214. In a preferred embodiment, diaphragm 220 is a flexible disc-shaped member having a central section that is pressed against or pulled away from valve seat 230 selectively in response to an applied actuation force. Diaphragm 220 includes a first side 234 positioned proximal to valve passage 214 and forming an upper boundary of central chamber 232. A second side 236 of diaphragm 220 opposite first side 234 is engaged by a means for applying actuation force, such as an actuator 240.

Diaphragm valve 200 is shown oriented with actuator 240 extending vertically from diaphragm 220 and valve passage 214. However, diaphragm valve 200 could also be oriented with actuator 240 extending to the side of, below, or at an incline relative to diaphragm 220 and valve passage 214. Furthermore, diaphragm 220, valve passage 214, and other parts of diaphragm valve 200 may be oriented in many different ways. For example, in an alternative valve body including a weir, the valve passage may be oriented at an angle to promote drainage across the weir when the valve is in the open position, as is common in prior art diaphragm valves. Thus, the designations of top, bottom, upper, lower, side, front, back, and other similar designations are used as a matter of convenience to describe the preferred embodiment, oriented as it is shown in the drawing figures, and should not be construed as limiting the scope of the invention.

Diaphragm 220 is preferably formed of a flexible plastic or elastomeric material. In some ALD systems, diaphragm 220 is preferably formed of a thin, molded disc of a plastic material such as polytetrafluoroethylene ("PTFE"), which may be of the type sold by E. I. du Pont de Nemours & Company, Wilmington, Del., USA, under the TEFLON® trademark. PTFE is a preferred diaphragm material for use in a precursor delivery system that delivers aluminum chloride ($AlCl_3$) to the reaction chamber 112. While PTFE is desirable for its purity, inertness, chemical resistance, heat resistance, and toughness, other plastic materials, such as polyvinylidene fluoride ("PVDF"), for example, may also be suitable for use in diaphragm 220. In ALD systems used in semiconductor manufacturing, diaphragm 220 may preferably be formed of an elastomer material, such as VITON® brand fluoroelastomer (FKM) made by DuPont Dow Elastomers LLC, Wilmington, Del., USA. Other suitable elastomeric materials for diaphragm 220 include ethylene propylene diene monomer ("EPDM"); silicone rubber; nitrile rubber; chloroprene rubber (neoprene); natural rubber; and perfluorinated elastomers (FFKM), such as KALREZ® made by DuPont Dow Elastomers LLC, CHEMRAZ® made by Greene, Tweede & Co., Medical & Biotechnology Group, Hatfield, Pa., USA, and SIMRIZ® sold by Freudenberg-NOK, Plymouth, Mich., USA. In some ways, elastomers are less desirable than plastics due to the inferior high-temperature resistance of elastomers and the tendency of fillers in some elastomers to contaminate precursor materials flowing through valve passage 214. However, elastomers such as VITON, EPDM, and others have good chemical resistance, good purity, and excellent sealing capabilities, making them preferred diaphragm materials for use with many of the ALD precursors used in semiconductor processing. Alternatively, diaphragm 220 may be formed of metal, especially when the temperature of the medium will exceed 260° C., having the potential to degrade elastomer materials. However, metal diaphragms are more vulnerable to fatigue-related failure and breakage than plastic and elastomeric diaphragms. Diaphragm 220 is preferably formed of a solid disc of material, but may also include structures that are not disc shaped, composite structures, and any other flexible shapes and structures that can be transitioned between open and closed positions. Thus, the term "diaphragm" is to be construed broadly to include any member that both borders valve passage 214 when open and can be moved or flexed to a closed position, thereby blocking valve passage 214.

To help prevent corrosion and/or buildup of precursor materials in flow path 110, the valve passage 214, diaphragm 220, and valve seat 230 may be coated with a passivation layer. The passivation layer may comprise an oxide, such as $Al_2O_3$, $ZrO_2$, $HfO_2$, $TiO_2$, $Ta_2O_5$, $SnO_2$, or $Nb_2O_5$; a nitride, such as AlN, ZrN, HfN, TiN, TaN, NbN, or BN; a carbide, such as TiC, TaC, ZrC, or HfC; or mixtures thereof. However, other passivation materials and coatings may be used. Passivation is particularly important when using halide-based precursors, to prevent exchange reactions between the halide-based precursors and the metal typically used in valve body 210 and valve seat 230. The specific composition of the passivation layer is selected for compatibility with the type of precursor or other medium with which diaphragm valve 200 is used. Other considerations, such as thermal properties, electrical properties, durability, and malleability, for example, may also be important factors in the selection of the material used for passivation.

Actuator 240 is operably coupled to diaphragm 220 for applying an actuation force for transitioning diaphragm 220 from the open position to the closed position. In an alternative embodiment, actuator 240 transitions diaphragm 220 from the closed position to the open position, or in both directions. However, the preferred diaphragm valve 200 for use in precursor material delivery system 100 is of a normally closed configuration. Actuator 240 preferably includes a solenoid 246 that can be energized by application of an electric current to drive a plunger 250 that transmits force to diaphragm 220. Solenoid 246 is the preferred actuator for diaphragm valve 200 due to its speed and generally low maintenance requirements. Alternatively, actuator 240 may include a different means for actuating diaphragm 220, such as a pneumatic or hydraulic cylinder, for example. Other devices and methods of actuating diaphragm 220, such as piezoelectric devices, for example, may also be used.

Plunger 250 of actuator 240 includes a first end section 256 engaged by solenoid 246 and a second end section 258 coupled to diaphragm 220. Plunger 250 may be coupled to diaphragm 220 in many ways. For example, diaphragm 220 may include a head 262 or ball end that extends from second side 236 of diaphragm 220 and snaps into lateral openings 266 (FIG. 3) in second end section 258 of plunger 250. This snap-fit connection between head 262 and plunger 250 allows actuator 240 to pull the central section of diaphragm 220 away from valve seat 230. It may also allow diaphragm 220 to be conveniently removed for repair or replacement without completely disassembling actuator 240, plunger 250, and other components of diaphragm valve 200.

Actuator 240 includes a stop 276 secured to solenoid 246 at its distal end 278 and extending into the center of solenoid 246 to limit outward travel of plunger 250. Stop 276 is preferably formed of a magnetic material (i.e., a material having a high permeance) to reduce the reluctance in the magnetic circuit of solenoid 246. More specifically, stop 276 reduces the high-reluctance air gap between distal end 278 of solenoid 246 and plunger 250, thereby reducing the overall reluctance in the magnetic circuit and intensifying the magnetomotive force exerted on plunger 250 by solenoid 246, when energized. The magnetomotive actuation force is further increased as plunger 250 moves closer to stop 276, i.e., when the low permeance gap between plunger 250 and stop 275 is reduced. In other embodiments, stop 276 is made of a nonmagnetic material or omitted entirely. A spring 280, preferably interposed between stop 276 and plunger 250, biases plunger 250 and diaphragm 220 toward the closed position wherein first side 234 of diaphragm 220 is pressed against valve seat 230 to block valve passage 214. Spring 280 is preferably seated in a counterbore in first end section 256 of plunger 250, but alternative embodiments may involve placement of spring 280 in another location or use of other means for biasing plunger 250 relative to valve seat 230. For example, in a normally open embodiment (not shown) plunger 250 is biased away from valve seat 230, and plunger 250 is driven toward valve seat 230 when actuator 240 is activated. In yet other embodiments, spring 280 may be omitted, in which case diaphragm 220 may be driven in both the opening and closing directions by actuator 240. In yet another embodiment, spring 280 is omitted and diaphragm 220 has a domed shape that is inherently resilient, providing an integral return spring force. Skilled persons will appreciate that many other means and devices may be employed for effecting return of diaphragm 220 to its normal position.

Preferably, diaphragm 220 is secured to valve body 210 by a heating body 290 to form a substantially hermetic seal along a perimeter of diaphragm 220 where it is clamped against rim 228 by heating body 290. Heating body 290 includes a proximal end 294 that is relieved to define a space 296 adjacent second side 236 of diaphragm 220. Space 296 provides clearance for diaphragm 220 when diaphragm 220 is moved to the open position (FIG. 4) and is substantially enclosed, although a small amount of clearance is provided around plunger 250 to allow plunger 250 to move freely in response to activation of actuator 240. For valves used in ALD systems, the clearance around plunger 250, the space 296, and any other passages in fluid communication with space 296 are preferably sealed to prevent leakage beyond valve 200 in the event that precursor or other medium escapes around the perimeter of diaphragm 220 or in the event that diaphragm 220 ruptures. However, it may not be necessary to hermetically seal space 296, particularly when diaphragm valve 200 is used in applications other than ALD systems. In the preferred embodiment, enclosed space 296 is defined, at least in part, by proximal end 294 of heating body 290. However, in alternative embodiments (not shown), space 296 is defined by one or more other components of diaphragm valve 200, such as, for example, the valve body, the actuator housing, a valve stem, or another structural member extending proximal to second side 236 of diaphragm 220.

To relieve pressure behind diaphragm 220, space 296 is preferably vented. Venting of enclosed space 296 may provide one or more benefits. For example, venting can reduce or prevent resistance to the movement of diaphragm 220 that would otherwise be caused by compression or expansion of gases trapped in space 296. When the medium flowing through valve passage 214 has a lowered operating pressure, as is the case in an ALD precursor material supply, suction may be applied in conjunction with venting to reduce a pressure differential acting on diaphragm 220. Suction can also be applied to generate a vacuum of the same pressure as the medium in valve passage 214, thereby equalizing the pressures on respective first and second sides 234 and 236 of diaphragm 220. In some embodiments, suction can be applied to venting to achieve a pressure in space 296 that is slightly less than the medium in valve passage 214, to thereby assist actuator 240 in opening diaphragm 220. Thus, in the preferred embodiment, the venting may advantageously reduce the force necessary to actuate diaphragm 220 and move it to the open position, and may also reduce the spring force necessary to return diaphragm 220 to the closed position. Similar force reductions are possible in an alternative normally open configuration, in which case the direction of actuation and spring forces would be reversed. By reducing forces needed to transition diaphragm 220 between the open and closed positions, venting may also extend the life of diaphragm 220 and prevent solenoid burnout. Extending the life of valves 104a-e in ALD precursor material delivery system 100 can significantly decrease downtime and improve yields in ALD reactor 102. Applying suction to space 296 has the further benefit of improving safety, in that any gas that leaks around or through diaphragm 220 is pumped away. This feature is of particular benefit when using toxic precursor materials, which might otherwise leak into human workspaces. Applying a vacuum to space 296 also reduces the density of gas in valve space 296, which restricts a convective pathway from diaphragm 220 to actuator 240.

Figure 3:
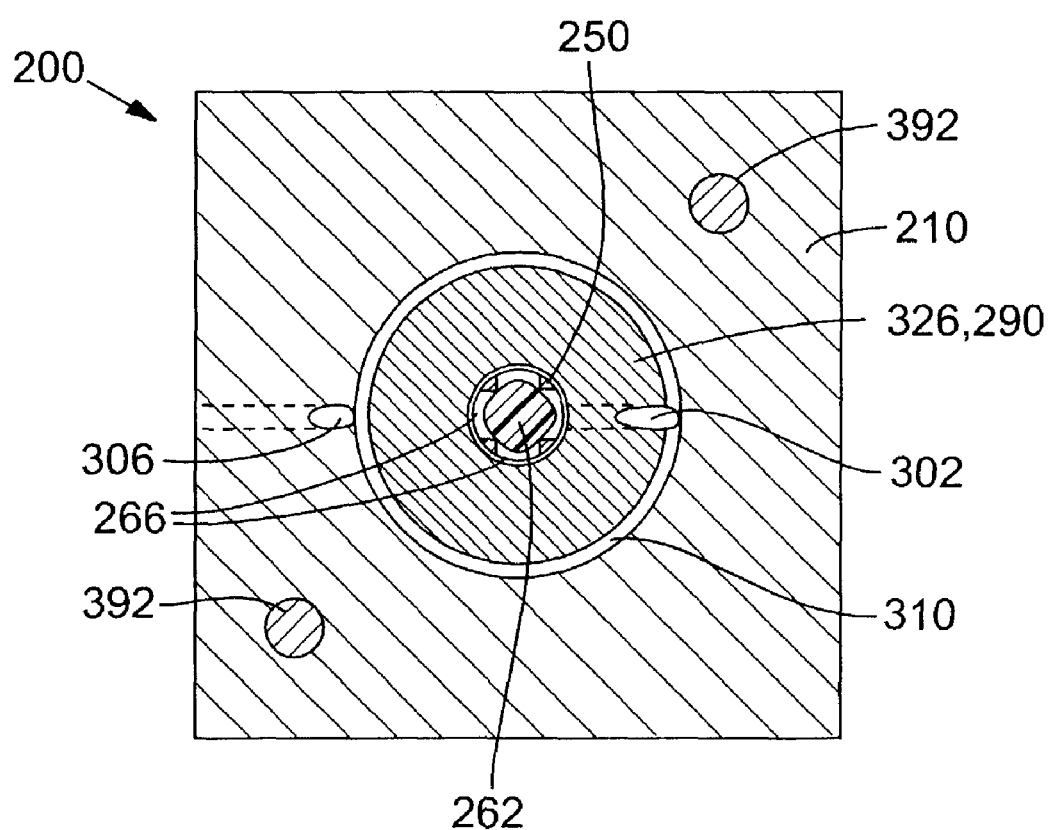
FIG. 3 is a cross section view of the diaphragm valve of FIG. 2, taken along line 3—3 of FIG. 2.

Venting is preferably accomplished by a venting passage, an embodiment of which is described below with reference to FIGS. 2 and 3. FIG. 3 is a cross section view of diaphragm valve 200 taken along lines 3—3 of FIG. 2. With reference to FIGS. 2 and 3, the venting passage includes a first vent passage section 302 extending through heating body 290 and communicating with space 296; a second vent passage section 306 passing through valve body 210; and an annular connecting passage 310 that extends around a mid-section of heating body 290 to link together the first and second vent passage sections 302 and 306. In other embodiments (not shown), the venting passage follows a different path, through one or more other parts of diaphragm valve 200. The formation of at least a portion of the venting passage in valve body 210 and, particularly, in body 122 of module 120, provides a convenient means for connecting a pump 316 or other source of suction to second vent passage section 306. More specifically, connection of pump 316 to the venting passage may include connecting the pump 316 to a manifold (not shown) that serves one or more of the diaphragm valves 104a–104e and, possibly, other modules 120 of precursor material delivery system 100 where suction is needed. Pump 316 is operable to draw a vacuum in space 296 relative to the pressure outside of valve body 210 (typically atmospheric pressure).

Resilient seals 328 and 382 are provided to prevent leakage around heating body 290 and to allow a vacuum to be achieved in space 296 behind diaphragm 220. As used herein, the term "vacuum" is used loosely to describe a fluid pressure that is lowered from its atmospheric or otherwise normal pressure. The suction generated by pump 316 preferably reduces the pressure in space 296 to a pressure that is the same as or close to the fluid pressure of the medium flowing through valve passage 214, thereby equalizing or nearly equalizing a differential force on diaphragm 220. In an alternative embodiment for use with a high-pressure medium, the pressure in space 296 is increased by application of a positive fluid pressure instead of suction. However, changing the fluid pressure in space 296 is optional and, therefore, pump 316 may be omitted in some embodiments. In a preferred ALD precursor material delivery system 100, pump 316 or another means for generating suction is operable to reduce the pressure in space 296 to between approximately 0.1 mbar and approximately 20 mbar, which is comparable to the operating pressure of precursor vapors in flow path 110 and valve passage 214.

Diaphragm valve 200 preferably includes features that enhance reliability when valve 200 is used to control the flow of a high temperature medium, such as an ALD precursor vapor used for depositing a thin film on a semiconductor wafer substrate, for example. The improved thermal design of diaphragm valve 200 may provide advantages over conventional diaphragm valves, in which solenoid actuators (or other types of actuators) are vulnerable to heat-related failure. For example, one conventional solenoid-actuated diaphragm valve is rated for operating temperatures of up to 140° C. When the operating temperature exceeds 140° C., the solenoid can overheat and melt a plastic bobbin supporting the solenoid coil and/or melt insulation around the coil windings, thereby causing blockage of the plunger, short circuiting of the coil, and other modes of failure. In non-solenoid valves, high operating temperatures can cause failure due to permanent deformation of structural components, melting or deformation of resilient seal materials in the actuator, and other causes.

Heat conducted to actuator 240 can also cool diaphragm 220 or valve body 210 enough to cause the medium to condense or freeze within valve passage 214 or on surfaces bordering valve passage 214. Condensation of the medium is particularly troublesome in an ALD precursor material delivery system 100, because particles or condensation can cause blockage in the delivery system 100 or may propagate into the reaction chamber 112, causing flaws in the films being formed. Condensation on the surfaces of diaphragm 220 and/or valve seat 230 can also cause leakage of precursor past valve 200, when closed, which can cause non-ALD growth in reaction chamber 112.

The operating temperature will depend on the vapor pressure of the particular precursor medium, but will typically be in the range of 130° C. to 220° C. To prevent condensation or freezing of the precursor gases as they travel along flow path 110, the precursor is gradually heated with a positive temperature gradient toward reaction chamber 112. In the preferred embodiment, the heat is provided by heaters 116 and 118 in two zones along precursor material delivery system 100, although a different number of zones and heaters may be used in an alternative embodiment (not shown). Heat may be provided by means other than electric heaters, but will generally result in the conduction of heat into valve body 210. To evenly and smoothly distribute heat along flow path 110, valve body 210 and bodies 122 of other modules 120 are preferably formed of a thermally conductive material such as aluminum, titanium, or stainless steel.

Heating body 290 is positioned in thermal contact with valve body 210 and extends proximal to second side 236 of diaphragm 220 to thereby form a thermally conductive pathway between valve body 210 and diaphragm 220. The thermally conductive pathway facilitates maintenance of an operating temperature at diaphragm 220 sufficient to prevent condensation in valve passage 214. Heating body 290 is interposed between diaphragm 220 and actuator 240 and includes a central opening 322 in alignment with diaphragm 220 and actuator 240, and through which plunger 250 extends for coupling actuator 240 to diaphragm 220. Second end section 258 of plunger 250 is preferably formed of a thermally conductive material and sized to closely but slidably fit within central opening 322, so that heat is readily transmitted from heating body 290 to diaphragm 220 through plunger 250. A core 326 of heating body 290 extends into a counterbore in valve body 210 above rim 228 and is shaped to define the annular connecting passage 310 (FIG. 3). A seal 328, such as an O-ring, is positioned around core 326 to form a hermetic seal between heating body 290 and valve body 210 at an axially distal location relative to annular connecting passage 310. A flange 332 of heating body 290 extends radially outward from core 326 adjacent an outer surface 334 of valve body 210. Flange 332 contacts outer surface 334 along a relatively large area, thereby improving heat conduction from valve body 210 to heating body 290. Flange 332 also provides a structure suitable for securing heating body 290 to valve body 210, for example, with one or more screws or other fasteners 392 (FIGS. 2–3). Flange 332 also compresses seal 328 against valve body 210 when secured by fasteners 392. Heating body 290 is preferably comprised of a material having a high thermal conductivity, such as aluminum, stainless steel, titanium, copper, or other metals, for example.

When diaphragm 220 is in the closed position in contact with valve seat 230, heat is conducted to diaphragm 220 via valve seat 230. Conduction from valve seat 230 helps replace in diaphragm 220 the heat lost by dissipation through plunger 250 and actuator 240 into the surrounding environment. Valve seat 230 is, accordingly, formed of a material having a relatively high thermal conductivity, such as aluminum, titanium, or another metal, for example. When used with a diaphragm made of an elastomeric material, valve seat 230 preferably includes a substantially flat annular seating surface 342 extending radially from inlet 216. Seating surface 342 provides increased contact area between diaphragm 220 and valve seat 230 when diaphragm 220 is closed. The increased contact area reduces the contact resistance (thermal) between valve seat 230 and diaphragm 220. Preferably valve seat 230 contacts a substantial portion of first side 234 of diaphragm 220 to promote heat transfer from valve seat 230 to diaphragm 220 along a thermally effective contact area opposite where plunger 250 contacts second side 236 of diaphragm. In the preferred embodiment, the area of contact between seating surface 342 and diaphragm 220 is comparable to the contact area between plunger 250 and diaphragm 220. When diaphragm 220 is closed, valve seat 230 may contact between approximately 5% and 100% of the portion of first side 234 of diaphragm 220 exposed to central chamber 232. More preferably, valve seat 230 may contact between approximately 12% and 50% of the exposed area of first side 234 of diaphragm 220, when diaphragm 220 is closed.

Seating surface 342 may also be polished or otherwise made smooth to further reduce contact resistance and to reduce leakage of medium between valve seat 230 and diaphragm 220 when diaphragm 220 is in the closed position. A passivation layer over first side 234 of diaphragm 220 can further enhance conduction of heat from valve seat 230 to diaphragm 220. For example, a passivation layer on first side 234 may comprise a layer of aluminum oxide ($Al_2O_3$) or another metallic coating having a thickness of between approximately 10 nm and approximately 100 nm.

Figure 5:
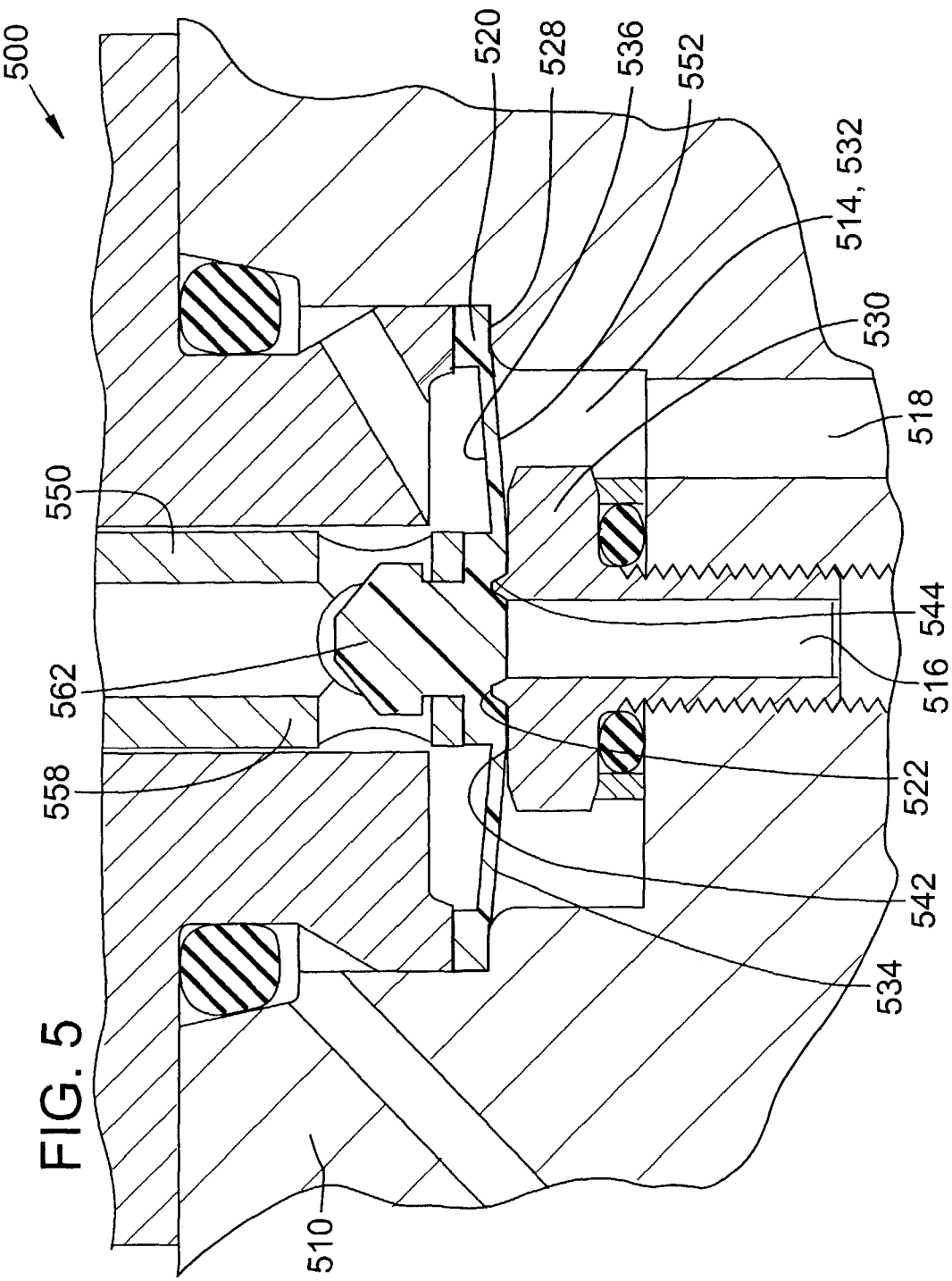
FIG. 5 is an enlarged cross section view detailing the seating region of a diaphragm valve including an alternative valve seat having a seating ridge suitable for use with a plastic diaphragm.

FIG. 5 is a cross sectional view of an alternative embodiment diaphragm valve 500 including a plastic diaphragm 520. With reference to FIG. 5, plastic diaphragm 520 is preferably formed of PTFE or another resilient, high-purity, chemically inert material, such as PVDF, for example. Because plastic diaphragm 520 does not seal as easily as elastomeric diaphragms, diaphragm valve 500 includes a modified valve seat 530 having a ring-shaped seating ridge 522 that extends upwardly from seating surface 542 toward diaphragm 520. Seating ridge 522 is sufficiently prominent and sized to permanently deform first side 534 of diaphragm 520 when diaphragm 520 is pressed against valve seat 530. Seating ridge 522 surrounds inlet 516 and is preferably located immediately adjacent inlet 516 to reduce the amount of spring force necessary to cause permanent deformation of diaphragm 520. However, in other embodiments (not shown) seating ridge 522 may be located outwardly of inlet 516 or in another location. Seating ridge 522 may be flat-topped, as shown in FIG. 5, or may have another shape, such as a knife edge. However, seating ridge 522 differs from knife-edge valve seats of the prior art in that seating ridge 522 is short enough to allow the first side 534 of diaphragm 520 to be pressed against the surrounding seating surface 542 after seating ridge 522 has formed a ring-shaped hit channel 544 in first side 534. In comparison, because particles in some environments can lodge on flat surfaces and interfere with closure of the diaphragm, prior art diaphragm valves prevent leaks by using sharp valve seats that are tall enough to prevent areal contact between the diaphragm and flat surfaces around the sharp seating edge. In the context of an ALD precursor material delivery system, sealing interference is best prevented by improved heat transfer between the valve seat 530 and diaphragm 520, to prevent particle formation due to cooling of the diaphragm.

Seating ridge 522 is preferably between approximately 0.5 mm and 1.5 mm in height above seating surface 542 to provide the desired permanent deformation of hit channel 544, while allowing areal contact between first side 534 of diaphragm 520 and seating surface 542 of valve seat 530 after hit channel 544 has been formed. The initial formation of hit channel 544 in first side 534 of diaphragm 520 may require a break-in period in which valve 500 is cycled prior to use. To provide the increased contact area between valve seat 530 and diaphragm 520 that promotes heat transfer, annular seating surface 542 may be sized and shaped similarly to that of the seating surface 342 of the embodiment of FIGS. 2–4, described above. For example, the area of contact between seating surface 542 and diaphragm 520 may be comparable to the contact area between a second end section 558 of plunger 550 and a second side 536 of diaphragm 520. When diaphragm 520 is closed, valve seat 530 may contact between approximately 5% and 100% of the portion of first side 534 of diaphragm 520 exposed to central chamber 532 and, more preferably, between approximately 12% and 50% of the exposed area.

Valve seat 530 may include a polished surface finish and/or passivation similar to the surface treatments described above in connection with valve seat 230 (FIGS. 2–4) of the type used with elastomeric diaphragm 220. Because the plastic material used in diaphragm 520 of FIG. 5 is stiffer than elastomeric materials of the diaphragm 220 of FIGS. 2–4, flexibility may be improved in diaphragm 520 by reducing the thickness of diaphragm 520 or, preferably, by forming an annular thin region 552 between a head 562 of diaphragm 520 and where diaphragm is mounted against a rim 528 of valve body 510. Diaphragm 520 and valve seat 530 are preferably rotationally secured to prevent relative rotation that can cause leakage due to misalignment between seating ridge 522 and hit channel 544. Preventing relative rotation between diaphragm 520 and valve seat 530 also facilitates the formation on first side 534 of a microroughness that mates against corresponding micro-roughness of seating surface 542, to thereby promote a hermetic seal.

Referring again to FIG. 2, a thermally resistive member is preferably interposed between valve passage 214 and actuator 240 to restrict or throttle the transfer of heat from valve passage 214 (i.e., from heating body 210 and/or diaphragm 220) to actuator 240. The thermally resistive member may comprise one or more structures for attenuating heat transfer between valve passage 214 and actuator 240, or between valve body 210 and actuator 240, or between heating body 290 and actuator 240, or between actuator 240 and one or more other parts of diaphragm valve 200.

One kind of thermally resistive member comprises a section of reduced cross sectional area between valve passage 214 and/or valve body 210 and actuator 240. For example, plunger 250 may include a hollow region 348 between respective first and second end sections 256 and 258. Hollow region 348 and the surrounding thin cylindrical wall of plunger 250 attenuate heat transfer between diaphragm 220 and actuator 240. As described above, attenuation of heat transfer prevents heat-related failure of solenoid 246 and cooling of diaphragm 220, which can otherwise result in condensation of the medium in valve passage 214.

To further inhibit heat transfer through plunger 250, plunger 250 may have a composite construction, wherein first end section 256 is formed of a magnetic material, second end section 258 is formed of a thermally conductive material (for conducting heat from heating body 290 to diaphragm 220), and an insulating central section 352 between respective first and second end sections 256 and 258. Central section 352 may be formed of a material having a substantially lower thermal conductivity than second end section 258 or may have a structure resulting in lower thermal conductivity than second end section 258.

Another kind of thermally resistive member includes a valve stem 360 supporting actuator 240 over and apart from heating body 290 and valve body 210. Valve stem 360 may include a section of reduced cross sectional area 364 for attenuating heat transfer between heating body 290 and actuator 240. To increase contact resistance, valve stem 360 preferably contacts heating body 290 and/or valve body 210 along only a very small area, if at all. For example, valve stem 360 may be supported on a small step 368 of a central boss 372 of heating body 290. An insulating pedestal 376 formed of a thermally resistive material such as plastic or ceramic may extend around or be positioned around a perimeter of flange 332 of heating body 290 to separate valve stem 360 from heating body 290. Insulating pedestal 376 may comprise a ring of insulating material, or may, alternatively, comprise a set of posts extending from flange 332 about its perimeter.

An elastomeric or plastic seal 382 is positioned around boss 372 and between heating body 290 and valve stem 360. Seal 382 prevents leakage of gases between heating body 290 and valve stem 360. An annular dead air space 386 may be formed between valve stem 360 and heating body 290 and between seal 382 and insulating pedestal 376. Dead air space 386 further insulates valve stem 360 from heating body 290. Actuator 240 may be secured to valve stem 360 by press fitting of solenoid 246 onto valve stem 360, by adhesives, or by other means. Valve stem 360 and heating body 290 are attached to valve body 210 by one or more screws 392 extending through holes in the radial portion of valve stem 360 and the flange 332 of heating body 290. Screws 392 are threaded into valve body 210 and thermally insulated from valve stem 360 by insulating washers 396 positioned under the heads of screws 392. Insulating washers 396 may be made of a plastic material such as PTFE, for example.

A thermally insulating slide bushing 402 is interposed between plunger 250 and actuator 240. Slide bushing 402 is preferably formed of a thermally insulating plastic material such as PTFE that also has a low coefficient of sliding friction against the inner surface of valve stem 360 within which first end section 256 of plunger 250 rides. Slide bushing 402 advantageously may inhibit heat transfer between plunger 250 and actuator 240, reduce frictional resistance to movement of plunger 250, and reduce wear and particle generation that can foul the movement of plunger 250 within actuator 240.

A blocking member 410 is interposed between plunger 250 and stop 276. Blocking member 410 is preferably comprised of a durable plastic material that cushions the impact of plunger 250 against stop 276 when solenoid 246 is energized. Cushioning of the impact can prevent cracking of stop 276 and/or plunger 250, thereby preventing the formation of particles that can foul the movement of plunger 250 within actuator 240. A suitable plastic material for blocking member 410 is PTFE. Blocking member 410 may also have thermal insulating properties to attenuate heat transfer between plunger 250 and stop 276 when plunger 250 is in the fully open position, in contact with blocking member 410.

When formed of a nonmagnetic material, such as PTFE or another plastic, blocking member 410 introduces a magnetic discontinuity between stop 276 and plunger 250 that can reduce a "release time" after removal of electric current from solenoid 246 before spring 280 will begin to move plunger 250 away from stop 276. The magnetic discontinuity introduced by blocking member 410, in effect, reduces the magnetic field at the extreme distal end of first end section 256 of plunger 250 by providing a nonmagnetic separation between the magnetically conductive stop 276 and the magnetically conductive first end section 256 of plunger 250. By way of further explanation, the attractive magnetic force on plunger 250 that is generated by solenoid 246 is not immediately removed when electric current to solenoid 246 is cut off. Rather, a certain amount of time must pass before the magnetic force decays below a threshold at which spring 280 can begin to move plunger 250 away from stop 276. Blocking member 410 reduces release time by reducing the holding force between solenoid 246 and plunger 250. Reducing the release time results in quicker switching from the on state to the off state, making it possible to shorten the total open time of diaphragm valve 200.

Prior art diaphragm valves, such as the ones described in U.S. Pat. No. 5,326,078 of Kimura and U.S. Pat. No. 6,116,267 of Suzuki et al., for example, include a valve seat having a sharp seating surface for deforming the diaphragm or increasing localized pressure on the diaphragm when it is pressed against the valve seat. As described above, diaphragm 220 may be comprised of an elastomeric material such as VITON® or EPDM, for example. When exposed to certain heated precursors and chemicals, such as $ZrCl_2$, for example, elastomer materials can become brittle, making them vulnerable to cracking and shearing against a sharp valve seat. In the preferred embodiment, seating surface 342 of valve seat 230 is characterized by an absence of sharp features, which may help prevent scoring and eventual shearing or cracking of diaphragm 220. Seating surface 342 is preferably larger than 5 $mm^2$ and more preferably larger than 25 $mm^2$. While it is desirable to size valve seat 230 large enough to prevent diaphragm 220 from shearing, the shape and size of valve seat 230 may, nevertheless, be selected so that the biasing force from spring 280 will cause slight surface deformation of first side 234 of diaphragm 220. Surface deformation causes first side 234 to better conform to seating surface 342, thereby reducing leakage of medium that can otherwise result from micro-roughness of first side 234 and/or seating surface 342. Surface deformation may include elastic deformation, or plastic deformation, or both. A smooth or polished surface finish of seating surface 342 may further improve the ability of diaphragm 220 to provide a leak-tight seal when pressed against seating surface 342.

As described above with reference to FIG. 5, when the diaphragm is comprised of a plastic material such as PTFE or PVDF, a predominantly flat seating surface may be less desirable. As compared to diaphragms formed of elastomeric material, a plastic diaphragm 520 (FIG. 5) has a greater hardness and is, thus, more difficult to seal against the valve seat. With reference to FIG. 5, valve seat 530 for use with a plastic diaphragm 520 preferably includes a seating ridge 522 extending from the seating surface 542 around inlet 516. The seating ridge 522 causes plastic deformation of first side 534 of diaphragm 520 when it is pressed against valve seat 530 during a break-in period. Diaphragm 520 can be pre-cycled to help break it in before commencing use of diaphragm valve 500. Plastic deformation occurring during pre-cycling or a break-in period imparts a ring-shaped hit channel 544 to diaphragm 520 that tightly mates against seating ridge 522 to prevent leakage. A similar sharp edge valve seat may also be desirable to increase localized sealing pressure when diaphragm 520 is made of metal, although it may be unnecessary or undesirable to plastically deform a metal diaphragm.

To ensure a tight seal, the valve seat 230, 530 and diaphragm 220, 520 are secured to the respective valve body 210, 510 and plunger 250, 550 to thereby prevent relative rotation. Preventing relative rotation between the valve seat and diaphragm ensures that the same location on diaphragm 220, 520 contacts valve seat 230, 530 in the same place every time the diaphragm valve 200, 500 is closed.

FIG. 4 is an enlarged cross section view detailing valve passage 214, valve seat 230, and diaphragm 220, with the diaphragm 220 shown transitioned to the open position. With reference to FIG. 4, annular seating surface 342 of valve seat 230 is sufficiently large so that first side 234 of diaphragm 220, when flexed to its slightly convex closed position, will not contact an outer peripheral edge 418 of seating surface 342. Seating surface 342 may also be curved along outer peripheral edge 418, as shown in FIG. 4, or may be slightly crowned (not shown), to further prevent scoring or shearing of diaphragm 220. Valve seat 230 is generally pedestal-shaped and includes a threaded neck 422 extending opposite seating surface 342. Valve seat 230 is screwed into valve body 210 to achieve good thermal contact. Preferably, valve seat 230 is threaded into an inlet portion of valve passage 214. However, in an alternative embodiment (not shown), inlet 216 and outlet 218 are reversed so that valve seat 230 is threaded into an outlet passage formed in valve body 210. Valve seat 230 may be coated with a passivation layer in a manner similar to diaphragm 220 and valve passage 214 (as described above) to prevent corrosion of valve seat 230 or buildup of precursor materials on seating surface 342 or inside inlet 216. A seat O-ring 430 is interposed between an upper pedestal portion of valve seat 230 and a lower surface of blind bore 226 of valve body 210 to provide a leak-tight seal between valve seat 230 and valve body 210. A spacer ring 440 or shim is interposed between upper pedestal portion of valve seat 230 and a floor of blind bore 226 of valve body 210 for establishing an axial position of valve seat 230 relative to valve body 210. Spacer ring 440 prevents overcompression of O-ring 430 and establishes an axial position of seating surface 342 relative to valve body 210 and diaphragm 220. Precise axial positioning of seating surface 342 allows for improved control of the seating pressure of diaphragm 220 against seating surface 342, thereby enhancing leak-tightness without applying excessive force that might cause scoring on first side 234 of diaphragm 220.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A diaphragm valve comprising:
a valve body defining a valve passage having an inlet and an outlet;
a valve seat surrounding one of the inlet and the outlet, the valve seat having an annular seating surface extending radially from said one of the inlet and the outlet, and adjacent the valve passage;
a flexible diaphragm having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby the first side of the diaphragm is pressed against the valve seat to thereby block the valve passage;
an enclosed space adjacent the second side of the diaphragm; and
a venting passage in communication with the enclosed space,
the seating surface being sized and shaped to contact a substantial portion of the first side of the diaphragm when the diaphragm is flexed to the closed position, thereby facilitating heat transfer between the valve seat and the diaphragm and inhibiting condensation on the first side of the diaphragm.

2. A diaphragm valve according to claim 1 wherein the seating surface contacts between approximately 5% and 100% of the first side of the diaphragm when closed.

3. A diaphragm valve according to claim 1 wherein the seating surface contacts between approximately 12% and 50% of the first side of the diaphragm when closed.

4. A diaphragm valve according to claim 1 wherein the seating surface is characterized by an absence of sharp features, thereby preventing shearing of the diaphragm.

5. A diaphragm valve according to claim 1 wherein the seating surface is polished, thereby improving heat transfer from the valve seat to the diaphragm when the first side of the diaphragm is pressed against the valve seat.

6. A diaphragm valve according to claim 1 wherein the seating surface is crowned.

7. A diaphragm valve according to claim 1 wherein the diaphragm is comprised of an elastomeric material.

8. A diaphragm valve according to claim 1 wherein the seating surface is bounded by an outer peripheral edge and sized so that the diaphragm does not contact the outer peripheral edge of the seating surface when the diaphragm is flexed to the closed position.

9. A diaphragm valve according to claim 1 further comprising a protective coating over the first side of the diaphragm.

10. A diaphragm valve according to claim 9 wherein the protective coating is selected from the group consisting of an oxide, a nitride, a carbide, and mixtures thereof.

11. A diaphragm valve according to claim 1 further comprising a protective coating lining the valve passage.

12. A diaphragm valve according to claim 11 wherein the protective coating is selected from the group consisting of an oxide, a nitride, a carbide, and mixtures thereof.

13. A diaphragm valve according to claim 1 further comprising a protective coating over the seating surface of the valve seat.

14. A diaphragm valve according to claim 13 wherein the protective coating is selected from the group consisting of an oxide, a nitride, a carbide, and mixtures thereof.

15. A diaphragm valve according to claim 1 further comprising an actuator for driving the diaphragm, the actuator including a movable plunger, a stop positioned to limit the movement of the plunger, and a protective blocking member interposed between the plunger and the stop.

16. A diaphragm valve according to claim 15 wherein the blocking member is comprised of a durable plastic material that cushions impact of the plunger against the stop to thereby prevent cracking of the stop and the plunger.

17. A diaphragm valve according to claim 15 wherein the blocking member is comprised of polytetrafluoroethylene.

18. A diaphragm valve according to claim 1 further comprising:
  a solenoid and a movable plunger operable to drive the diaphragm; and
  a slide bushing interposed between the plunger and the solenoid.

19. In combination with the diaphragm valve of claim 1, a pump operably coupled to the venting passage for reducing a fluid pressure in the enclosed space.

20. A diaphragm valve according to claim 1 further comprising a spring for biasing the diaphragm toward one of the open and closed positions and an actuator operably engaged with the diaphragm for driving the diaphragm in a direction opposite the spring.

21. A diaphragm valve according to claim 20 wherein:
  the actuator includes a solenoid and a movable plunger;
  the spring biases the diaphragm toward the closed position; and
  the plunger is driven to oppose the spring and move the diaphragm to the open position in response to energizing of the solenoid coil.

22. A diaphragm valve according to claim 1 further comprising means contacting the valve body for conducting heat from the valve body toward the second side of the diaphragm to facilitate maintaining an operating temperature at the diaphragm.

23. In combination with a diaphragm valve according to claim 1, means for heating a medium in the valve passage to thereby prevent the medium from condensing or freezing in the valve passage.

24. In combination with a diaphragm valve according to claim 1, means for drawing a vacuum in the enclosed space.

25. A diaphragm valve according to claim 1 wherein the venting passage extends through the valve body.

26. A diaphragm valve according to claim 1 wherein the diaphragm is comprised of a plastic material.

27. A diaphragm valve comprising:
  a valve body defining a valve passage having an inlet and an outlet;
  a valve seat surrounding one of the inlet and the outlet, the valve seat having an annular seating surface extending radially from said one of the inlet and the outlet, and adjacent the valve passage; and
  a flexible diaphragms having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby the first side of the diaphragm is pressed against the valve seat to thereby block the valve passage,
  the valve seat including a seating ridge surrounding said one of the inlet and the outlet, and extending from the seating surface toward the diaphragm.

28. A diaphragm valve according to claim 27 wherein the seating ridge extends from the seating surface to a height of between approximately 0.5 mm and 1.5 mm.

29. A diaphragm valve according to claim 27 wherein the diaphragm is comprised of a plastic material.

30. A diaphragm valve according to claim 27 wherein the seating ridge is sufficiently tall and sharp so that the first side of the diaphragm is permanently deformed over the seating ridge in response to pressing of the diaphragm against the valve seat.

31. A diaphragm valve according to claim 27 wherein the first side of the diaphragm is deformed over the seating ridge in response to pressing of the diaphragm against the valve seat, and the seating ridge is short enough to allow a substantial portion of the first side of the diaphragm to be pressed against the seating surface when the first side of the diaphragm is deformed over the seating ridge.

32. A diaphragm valve comprising:
  a valve body defining a valve passage having an inlet and an outlet;
  a valve seat surrounding one of the inlet and the outlet, the valve seat having an annular seating surface extending radially from said one of the inlet and the outlet, and adjacent the valve passage;
  a flexible diaphragm having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby the first side of the diaphragm is pressed against the valve seat to thereby block the valve passage; and
  a spacer ring interposed between the valve seat and the valve body to establish an axial position of the seating surface relative to the valve body.

33. A diaphragm valve according to claim 32 wherein the seating surface is polished, thereby improving heat transfer front the valve seat to the diaphragm when the first side of the diaphragm is pressed against the valve seat.

34. A diaphragm valve according to claim 32 wherein the diaphragm is comprised of a plastic material.

35. A diaphragm valve comprising:
  a valve body defining a valve passage having an inlet an outlet;
  a valve seat surrounding one of the inlet and the outlet, the valve seat having an annular seating surface extending radially from said one of the inlet and the outlet, and adjacent the valve passage;
  a flexible diaphragm having first and second sides, the diaphragm positioned adjacent the valve passage opposite the valve seat with the first side facing toward the seating surface of the valve seat, the diaphragm operable in response to an applied actuation force of flex between an open position whereby the valve passage is at least partially open and a closed position whereby a substantial portion of the first side of the diaphragm is pressed against the valve seat to thereby block the valve passage and facilitate heat transfer between the valve seat and the diaphragm; and
  a heating body thermally contacting the valve body and extending proximal to the second side of the diaphragm thereby forming a thermally conductive pathway that facilitates maintaining an operating temperature at the diaphragm.

36. In combination with a diaphragm valve according to claim 35 a heater in thermal association with the valve body, the heater adapted to generate heat that is conducted through the valve body and the heating body to thereby prevent a medium in the valve passage from condensing or freezing in the valve passage.

37. A diaphragm valve according to claim 35 further comprising:
an actuator for driving the diaphragm; and
a thermally resistive member interposed between the valve passage and the actuator for attenuating heat transfer between the valve passage and the actuator.

38. A diaphragm valve according to claim 35 wherein the diaphragm is comprised of a plastic material.

39. A diaphragm valve comprising:
a valve body defining a valve passage having an inlet and an outlet;
a valve seat surrounding one of the inlet and the outlet, the valve seat having an annular seating surface extending radially from said one of the inlet and the outlet, and adjacent the valve passage;
a flexible diaphragm having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby a substantial portion of the first side of the diaphragm is pressed against the valve seat to thereby block the valve passage and facilitate heat transfer between the valve seat and the diaphragm;
means for actuating the diaphragm; and
means for attenuating heat transfer between the valve passage and the means for actuating.

40. A diaphragm valve according to claim 39 wherein the means for actuating includes a solenoid.

41. A diaphragm valve according to claim 39 wherein the diaphragm is comprised of a plastic material.

42. A diaphragm valve comprising:
a valve body defining a valve passage having an inlet and an outlet;
a valve seat surrounding one of the inlet and the outlet, the valve seat having an annular seating surface extending radially from said one of the inlet and the outlet, and adjacent the valve passage;
a flexible diaphragm having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby a substantial portion of the first side of the diaphragm is pressed against the valve seat to thereby block the valve passage and facilitate heat transfer between the valve seat and the diaphragm; and
means for reducing a fluid pressure on the second side of the diaphragm.

43. A precursor material delivery system including a diaphragm valve comprising:
a valve body defining a valve passage having an inlet and an outlet;
a valve seat surrounding one of the inlet and the outlet, the valve seat having an annular seating surface extending radially from said one of the inlet and the outlet, and adjacent the valve passage; and
a flexible diaphragm having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby a substantial portion of the first side of the diaphragm is pressed against the valve seat to thereby block the valve passage and facilitate heat transfer between the valve seam and the diaphragm.

44. A precursor material delivery system according to claim 43, further comprising a heater in thermal association with the valve body.

45. A precursor material delivery system according to claim 43 wherein the seating surface of the diaphragm valve contacts between approximately 5% and 100% of the first side of the diaphragm when closed.

46. A precursor material delivery system according to claim 43 wherein the seating surface of the diaphragm valve contacts between approximately 12% and 50% of the first side of the diaphragm when closed.

47. A precursor material delivery system according to claim 43 wherein the seating surface of the diaphragm valve is characterized by an absence of sharp features, thereby preventing shearing of the diaphragm.

48. A precursor material delivery system according to claim 43 wherein the seating surface is polished, thereby improving heat transfer from the valve seat to the diaphragm when the first side of the diaphragm is pressed against the valve seat.

49. A precursor material delivery system according to claim 43 wherein the valve seat includes a seating ridge surrounding said one of the inlet and the outlet, and extending from the seating surface toward the diaphragm.

50. A precursor material delivery system according to claim 43 wherein the diaphragm of the diaphragm valve is comprised of a plastic material.

51. A precursor material delivery system according to claim 43 further comprising a spacer ring interposed between the valve seat and the valve body to establish an axial position of the seating surface relative to the valve body.

52. A precursor material delivery system according to claim 43 further comprising a protective coating over the first side of the diaphragm.

53. A precursor material delivery system according to claim 52 wherein the protective coating is selected from the group consisting of an oxide, a nitride, a carbide, and mixtures thereof.

54. A precursor material delivery system according to claim 43 further comprising a protective coating lining the valve passage.

55. A precursor material delivery system according to claim 54 wherein the protective coating is selected from the group consisting of an oxide, a nitride, a carbide, and mixtures thereof.

56. A precursor material delivery system according to claim 43 further comprising a protective coating over the seating surface of the valve seat.

57. A precursor material delivery system according to claim 56 wherein the protective coating is selected from the group consisting of an oxide, a nitride, a carbide, and mixtures thereof.

58. An ALD reactor including a diaphragm valve comprising:
a valve body defining a valve passage having an inlet and an outlet;
a valve seat surrounding one of the inlet and the outlet, the valve seat having an annular seating surface extending radially from said one of the inlet and the outlet, and adjacent the valve passage; and a flexible diaphragm having first and second sides, the diaphragm positioned adjacent the valve passage opposite the valve seat with the first side facing toward the seating surface of the valve seat, the diaphragm operable in response to an applied actuation force to flex between an open position whereby the valve passage is at least partially open and a closed position whereby a substantial portion of the first side of the diaphragm is pressed against the valve seat to thereby block the valve passage and facilitate heat transfer between the valve seat and the diaphragm.

59. An ALD reactor according to claim 58, further comprising:
an enclosed space adjacent the second side of the diaphragm;
a venting passage in communication with the enclosed space; and
a pump operably coupled to the venting passage for reducing a fluid pressure in the enclosed space.

60. An ALD reactor according to claim 59 wherein the venting passage extends through the valve body.

61. An ALD reactor according to claim 58 wherein the seating surface of the diaphragm valve contacts between approximately 5% and 100% of the first side of the diaphragm when closed.

62. An ALD reactor according to claim 58 wherein the seating surface of the diaphragm valve contacts between approximately 12% and 50% of the first side of the diaphragm when closed.

63. An ALD reactor according to claim 58 wherein the seating surface of the diaphragm valve is characterized by an absence of sharp features, thereby preventing shearing of the diaphragm.

64. An ALD reactor according to claim 58 wherein the valve seat includes a seating ridge surrounding said one of the inlet and the outlet, and extending from the seating surface toward the diaphragm.

65. An ALD reactor according to claim 58 wherein the diaphragm of the diaphragm valve is comprised of a plastic material.

66. An ALD reactor according to claim 58 further comprising a spacer ring interposed between the valve seat and the valve body to establish an axial position of the seating surface relative to the valve body.

* * * * *

UNITED STATES PATENT AND TRADEMARK OFFICE
CERTIFICATE OF CORRECTION

PATENT NO.       : 7,021,330 B2
APPLICATION NO.  : 10/609339
DATED            : April 4, 2006
INVENTOR(S)      : Jarmo Ilmari Maula et al.

It is certified that error appears in the above-identified patent and that said Letters Patent is hereby corrected as shown below:

<u>Column 2</u>
Line 57, change "pat" to --path-- and "Valve" to --valve--.

<u>Column 17</u>
Line 51, delete "s" from "diaphragms" in phrase "a flexible diaphragms".

<u>Column 18</u>
Line 34, change "front" to --from--.

<u>Column 18</u>
Line 39, add --and-- after "inlet".

<u>Column 18</u>
Line 50, change "of" to --to--.

<u>Column 18</u>
Line 63, add a comma after "35".

Signed and Sealed this

Twenty-eighth Day of October, 2008

JON W. DUDAS
*Director of the United States Patent and Trademark Office*